United States Patent Office 3,489,543
Patented Jan. 13, 1970

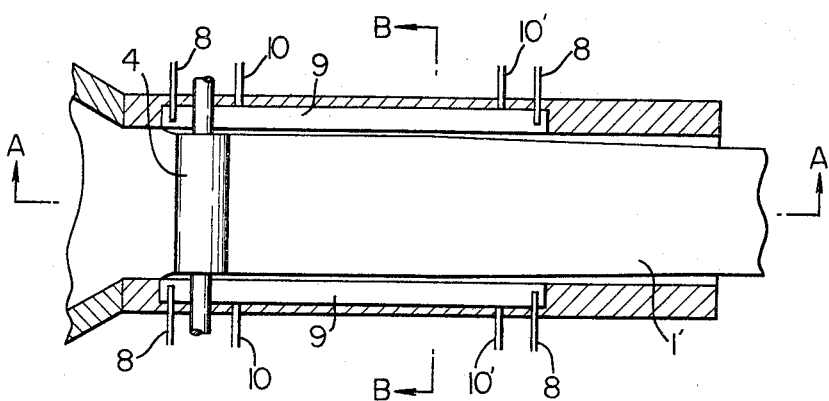
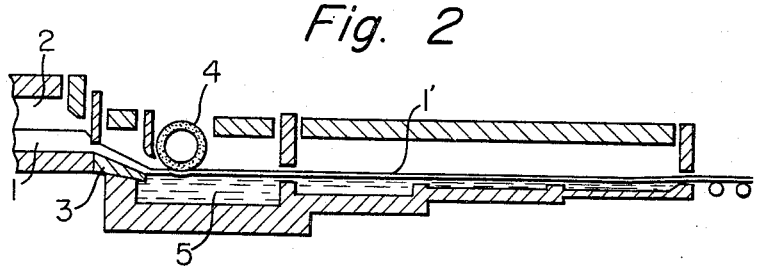
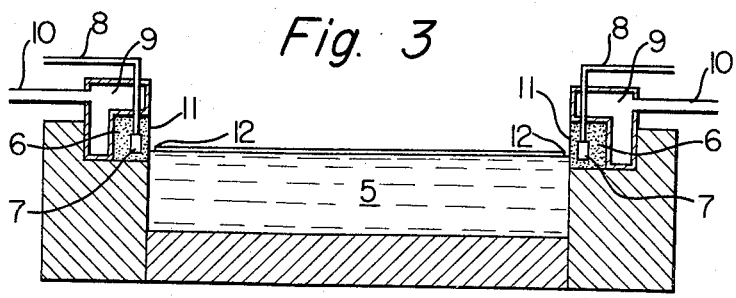

3,489,543
METHOD AND APPARATUS FOR THE MANUFACTURE OF FLOAT GLASS UTILIZING POROUS REFRACTORY STATIONARY SIDEWALLS
Hideo Kita, Amagasaki-shi, and Ito Kunihiko, Nishinomiya-shi, Japan, assignors to Nippon Sheet Glass Co., Ltd., Osaka, Japan
Continuation of application Ser. No. 513,208, Dec. 13, 1965. This application Aug. 28, 1968, Ser. No. 768,579
Claims priority, application Japan, Dec. 23, 1964, 39/72,150
Int. Cl. C03b 18/02
U.S. Cl. 65—25
9 Claims

ABSTRACT OF THE DISCLOSURE

A method and apparatus for manufacturing sheet glass of uniform thickness and width. A molten glass feeding means feeds a continuous ribbon of molten glass from a glass furnace onto an elongated bath of molten metal. In order to keep the edges of the ribbon of glass away from the edges of the molten metal bath, so that the width of the glass will remain substantially constant, the bath has gas permeable porous refractory stationary sidewall members positioned at the upper part of both side walls of the molten metal bath and at least at that part of the bath where contact is had with the side edges of the glass and positioned at a uniform lateral spacing from each other. Gas under pressure is supplied to the refractory members and is jetted through the refractory members laterally inwardly against the side edges of the glass ribbon on the molten metal bath.

---

This application is a continuation of our now abandoned application Ser. No. 513,208, filed Dec. 13, 1965.

This invention relates to a method and apparatus for manufacturing sheet glass continuously by flowing a ribbon of molten glass on a bath of molten metal, and in particular, to a method and apparatus for making the thickness of the ribbon of glass uniform by blowing a gas against the side edges of the ribbon of molten glass passing over the bath of molten metal.

In manufacturing sheet glass continuously by flowing molten glass over a bath of molten metal and advancing the molten glass thereover, on account of the adhesion of the side edges of the flowing molten glass to side walls of the bath of molten metal when it contacts said side walls, the following defects occur. As a consequence of the adhesion of the side edges of the ribbon of glass to the side walls, the advance of the side edges of the glass ribbon is impeded resulting in the rate of advance of side edges of the glass ribbon becoming less than that of the middle portion of the glass ribbon. Hence, the thickness of the side edges becomes less than that of the middle portion, with the consequence that a sheet glass of uniform thickness cannot be obtained. Further, since the glass ribbon on the bath of molten metal is under tension in the direction of its advance, the width of the glass becomes smaller and at some places the side edges of the glass separate from the side walls of the bath. At this time, since the degree of adhesion between the side edges of the glass and the side walls of the bath frequently differ on each side of the glass, there are occasions in which either the direction of advance of the glass is caused to deviate or the solidified glass collides with the side walls of the bath, which causes damage to the sheet glass.

To cope with this trouble, proposals have been made for employing a material to which glass does not readily adhere, such as graphite or the like, for the side wall bricks of the bath with which the side edges of the glass make contact. It was found, however, to be difficult to attain fully satisfactory results since there was still present some friction between the molten glass and the graphite in the zone of elevated temperature of the molten metal bath and also because of the attrition of the graphite or the like.

It is an object of the present invention to overcome the defects such as hereinabove described and provide an improved method and apparatus for manufacturing sheet glass having uniform thickness in a stable state.

The foregoing object can be attained in accordance with the present invention by providing in the two side walls of the bath of molten metal in at least the portions facing the side edges of the continuous ribbon of glass, means for continuously jetting forth a gas, said means being composed of a porous, gas-permeable refractory material and adapted to jet forth from its surface against the side edge of the glass ribbon a pressurized gas which has been introduced into its interior.

Among the aforesaid refractory material are included graphite, high alumina refractories and the like, those having a porosity on the order of 20–30% being satisfactory.

In one embodiment of the present invention, the aforesaid means for continuously jetting forth a gas comprises a porous, air-permeable refractory material, a cavity in the interior of said material extending along the side wall of the bath, conduits for introducing a pressurized gas into said cavity passing through said material and communicating with said cavity, and cooling means for cooling said material, said means adapted to jet forth a pressurized gas introduced into said cavity against the side edge of the glass ribbon from the surface of said material facing said side edge.

In carrying out the method by the use of the apparatus, the gas, which is a non-oxidizing gas, is blown from the surface of the porous refractory material at a rate of about 100–5000 cc./hr. per square centimeter of said surface.

When the apparatus is used, the adhesion between the side walls of the molten metal bath and the side edges of the glass ribbon which make contact therewith can be completely prevented. Thus, the glass ribbon can advance without being impeded, and since it advances at an equal rate with equal tension being imparted to its side edges and middle portions, sheet glass of uniform thickness can be obtained. Moreover, since there occurs no deviation of the direction of advance, sheet glass can be manufactured in a stable state without damage occurring to the glass.

Reference is made to the accompanying drawing which illustrates one embodiment of the present invention and in which:

FIG. 1 is a plan view of the apparatus of the invention;
FIG. 2 is a side view in longitudinal section taken along line A–A' of FIG. 1; and
FIG. 3 is an end view in cross-section taken along line B–B' of FIG. 1.

Referring to the drawing, in FIGS. 1 and 2, molten glass 1 flows from a forehearth 2 of a melting furnace down over lip tile 3 having an inclined top surface and thence to the sizing apparatus consisting of a pressure roll 4 and a molten metal bath 5, where it is made into a ribbonlike glass 1' having a smooth and flat surface. At the upper part of both side walls of the molten metal bath and at least that part where contact is had with the side edges of the glass, members 6 composed of porous, gas-permeable refractories are provided. As shown in FIG. 3, the porous, gas-permeable refractory side walls 6 of graphite have cavities or pressure chambers 7 provided in the interior thereof, these chambers extending along the whole length of the side walls of the bath. Gas supply pipes 8 are in communication with the pressure chambers 7. Cooling boxes 9 are provided around the side walls 6 and cooling medium supply and discharge pipes 10 and 10' in communication therewith. A gas is introduced under pressure into the pressure chambers 7 through the pipe 8 and jetted from the surfaces 11 of said side walls facing the side edges of the glass ribbon. As a result of jetting the gas under pressure, a thin gas film is formed between the side wall surfaces 11 and the side edge portions 12 of the glass ribbon to prevent completely the adhesion between the side edge portions of the glass ribbon and the side wall surfaces. The porous side walls 6 are cooled by the introduction into the cooling boxes 9 and discharge therefrom of cooling medium, such as water, via the pipes 10 and 10'.

The gas to be introduced under pressure to the inside of the porous side walls 6 is non-oxidizing, i.e. one which is inert, for example, nitrogen, or one which is reducing so as to prevent the oxidation of the molten metal. While the pressure at which the gas is introduced will depend upon the resistance to gas permeation of the porous side wall 6, i.e., its gas permeability and thickness, an initial gas pressure of 0.5–5 kg./cm.$^2$ will do in the case of a porous side wall having a porosity of 20–30%. It is preferred, if possible, that the gas to be introduced under pressure be preheated to a temperature substantially the same as that of the glass ribbon. In most cases, a rate of flow of the gas of 100–5000 cm.$^3$/hr. per one square centimeter of the surface area of the porous side wall is suitable.

Although the foregoing description has dealt with the instance where a sizing apparatus consisting of a pressure roll and a molten metal bath has been employed, needless to say, similar results can be also obtained without the use of a pressure roll.

When, as hereinbefore described, a molten metal bath having the porous side walls of the present invention is employed, the adhesion between the side walls of the metal bath and the side edges of the glass ribbon is not only completely prevented, but also attrition of the side walls does not occur. Hence, it becomes possible to manufacture sheet glass of uniform thickness in a stable state over a long period of time.

What is claimed is:

1. A process for the manufacture of sheet glass which comprises feeding molten glass continuously from a glass melting furnace onto a bath of molten metal and advancing the glass in the form of a continuous ribbon over the bath, and while thus advancing the glass, blowing a pressurized non-oxidizing gas laterally inwardly against each side edge of the ribbon advancing over said bath through a stationary side wall of a gas-permeable porous refractory material to maintain a thin gaseous film between the surface of the porous refractory material and the side edge of the glass ribbon, so that no deviation occurs in the direction of advance of said glass, and thereby making the thickness of the glass ribbon uniform in the direction of the width of the glass ribbon.

2. The process of claim 1 wherein the porous refractory material is graphite.

3. The process of claim 1 wherein the porous refractory material is a high alumina refractory.

4. The process of claim 1 wherein the pressurized non-oxidizing gas is blown from the surface of the porous refractory material at a rate of about 100–5000 cc./hr. per square centimeter of said surface.

5. The process of claim 1 wherein the pressurized non-oxidizing gas is preheated to a temperature substantially the same as that of the glass ribbon.

6. A process for the manufacture of sheet glass which comprises feeding molten glass continuously from a glass melting furnace onto a bath of molten metal and advancing the glass in the form of ribbon over the bath; and while thus advancing the glass, blowing a pressurized non-oxidizing gas laterally inwardly against each side edge of the ribbon advancing over the bath through a stationary side wall of a gas-permeable porous refractory material having a porosity of 20–30% and selected from the group consisting of graphite and alumina to maintain a thin gaseous film between the surface of the porous refractory material and the side edge of the glass ribbon so that no deviation occurs in the direction of advance of the width of the glass ribbon, to thereby make the thickness of the glass ribbon uniform in the direction of the width of the glass ribbon, and further maintaining the blowing of the pressurized non-oxidizing gas at an initial gas pressure of 0.5–5 kg./cm.$^2$ and blowing it from the surface of the refractory material at a rate of about 100–5000 cc./hr. per square centimeter of said surface.

7. An apparatus for manufacturing sheet glass of uniform thickness and width, comprising means for providing an elongated bath of molten metal for receiving a continuous ribbon of molten glass from a glass furnace, a molten glass feeding means at an input end of said elongated bath between the bath and the furnace for feeding a ribbon of glass of uniform thickness and width onto said molten bath, gas permeable porous refractory stationary sidewall members positioned at the upper part of both side walls of the molten metal bath and at least at that part of the bath where contact is had with the side edges of the glass and at a uniform lateral spacing from each other and having a vertical dimension at least as great as the thickness of the glass, and gas pressure supplying means connected to said refractory members for supplying pressurized gas to said members, means defining pressure chambers withn said refractory members for jetting said gas through said refractory members against the side edges of the glass ribbon on the molten metal bath to keep the molten glass spaced from the said refractory members.

8. An apparatus as defined in claim 7 in which said gas pressure supplying means comprise conduits extending through said refractory members into the pressure chambers thereof.

9. An apparatus as defined in claim 7 further comprising hollow cooling members extending along at least some of the surfaces of said refractory members other than the surfaces facing said molten metal bath, and cooling fluid circulating means coupled to said cooling members for circulating cooling fluid to cool said refractory members.

References Cited

UNITED STATES PATENTS

| | | | |
|---|---|---|---|
| 2,478,090 | 8/1949 | Deuol | 65—25 |
| 3,266,880 | 8/1966 | Pilkington | 65—99 |

S. LEON BASHORE, Primary Examiner

E. R. FREEDMAN, Assistant Examiner

U.S. Cl. X.R.

65—65, 99, 169, 182